(12) United States Patent
Lauer et al.

(10) Patent No.: US 6,253,416 B1
(45) Date of Patent: Jul. 3, 2001

(54) BLOWER AIR STREAM DIVERTER

(75) Inventors: G. Kent Lauer, Lee's Summit; Se Han Kim, Blue Springs; Holland A. Mertell, Independence, all of MO (US)

(73) Assignee: Billy Goat Industries, Inc., Lee's Summit, MO (US)

( * ) Notice: Subject to any disclaimer, the term of this patent is extended or adjusted under 35 U.S.C. 154(b) by 0 days.

(21) Appl. No.: 09/517,996

(22) Filed: Mar. 3, 2000

(51) Int. Cl.$^7$ .................................................. A47L 5/34
(52) U.S. Cl. ................... 15/361; 15/405; 15/414
(58) Field of Search ................ 15/405, 418, 361, 15/414

(56) References Cited

U.S. PATENT DOCUMENTS

| | | |
|---|---|---|
| 3,959,846 * | 6/1976 | Yasuda .............................. 15/405 X |
| 4,118,826 | 10/1978 | Kaeser . |
| 4,187,577 | 2/1980 | Hansen et al. . |
| 4,227,280 | 10/1980 | Comer . |
| 4,476,773 | 10/1984 | Fehr . |
| 4,549,848 | 10/1985 | Wallman . |
| 4,573,869 | 3/1986 | Kitamoto . |
| 4,597,203 | 7/1986 | Middleton . |
| 4,799,287 | 1/1989 | Belanger et al. . |
| 5,026,251 | 6/1991 | Kinoshita et al. . |
| 5,044,887 | 9/1991 | Duthie et al. . |
| 5,107,564 * | 4/1992 | Grumbles .......................... 15/405 X |
| 5,107,566 * | 4/1992 | Schmid ............................. 15/405 X |
| 5,171,128 | 12/1992 | Williamson et al. . |
| 5,324,167 | 6/1994 | Moczadlo et al. . |
| 5,551,836 | 9/1996 | Roth et al. . |
| 5,588,178 | 12/1996 | Liu . |
| 5,735,018 | 4/1998 | Gallagher et al. . |
| 5,768,749 * | 6/1998 | Ohi et al. .............................. 15/405 |
| 5,950,276 * | 9/1999 | Everts et al. .......................... 15/405 |
| 6,009,595 * | 1/2000 | Leasure et al. .................... 15/405 X |
| 6,073,305 * | 6/2000 | Hesskamp ............................. 15/405 |
| 6,076,231 * | 6/2000 | Bucher ................................. 15/405 |

* cited by examiner

*Primary Examiner*—Chris K. Moore
(74) *Attorney, Agent, or Firm*—Spencer Fane Britt & Browne LLP (57) ABSTRACT

An apparatus is provided for use with a mobile air blower which allows the blower air stream to be oscillated vertically or redirected away from the work piece to avoid damage to vehicles and structure that are in the path of the air blower air stream and the apparatus provides for redirection of the air stream in forward and rearward directions.

7 Claims, 7 Drawing Sheets

BLOWER AIR STREAM DIVERTER

FIELD OF THE INVENTION

The present invention relates to commercial air blowers of the type that are mobile and used to sweep away leaves, or dirt and gravel from a street or parking surface or for sweeping away debris. Specifically, the present invention provides a means for redirecting the air stream of the blower away from the work area or work piece to avoid undesired blowing of debris when the blower is near vehicles or structures or other object which might be damaged by the blown debris.

BACKGROUND OF THE INVENTION

Figure 1:
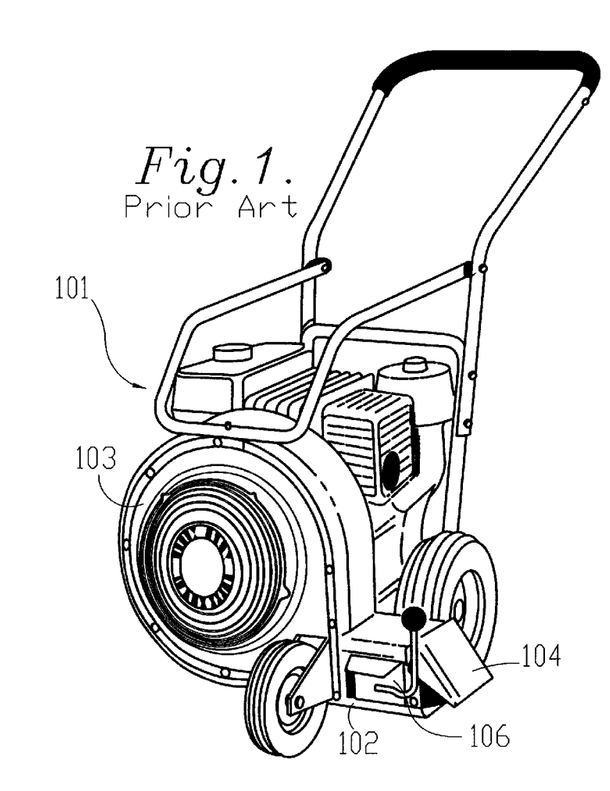
FIG. 1 is perspective view of a prior art blower device having a top mounted deflector on the discharge chute, and a diverter plate in the discharge chute for diverting air flow to a forward direction.

Referring now to FIG. 1, mobile air blower units are commonly used in the removal of grass clippings and leaves from lawns and other surfaces. Mobile blowers also are used to clean parking lot surfaces and to clean out cracks in paved surfaces prior to sealing the parking lot surface or filling the cracks. In addition, blowers are used to move rubbish and debris from sports stadia after a sporting or other event.

Typically, these blowers are powered by gasoline engines or elector motors (hereinafter referred to collectively as motors) which rotate a fan (not shown) in a housing 113 to generate a high velocity air stream which is directed at the leaves or debris. Frequently, as the blower is pushed near the vicinity of an automobile in a parking lot there is a risk that dirt, grit, small stones and other objects will be projected toward the vehicle and damage the paint or body of the vehicle. When a blower is used on a lawn or to blow leaves the same need to redirect the air stream may occur. As the blower approaches a vehicle in a driveway, or a flower bed, or other delicate object or structure it may be desirable to redirect the air stream to avoid blasting the object with the high velocity air stream. However, those familiar with mobile blower units will appreciate that seldom is a blower provided with a means of halting the operation of the fan, and the air stream, without turning off the motor.

Another problem with prior art blower units is the inability to redirect the entire air stream as the blower is moved along a path of travel. In one blower device provision is made for subdividing the air stream to direct a portion of the air stream upwardly and a portion of the air stream downwardly. Such manual air stream splitting and redirection can be seen in U.S. Pat. No. 5,735,018 to Gallagher et al, however, the Gallagher device does not permit the operator to redirect the entire airstream or to continually move or redirect the air stream as the device is moved by the operator along a path of travel.

The device of Gallagher relies upon a deflector (48) which is mounted within the discharge chute (24) of the blower (10). The deflector can be positioned to deflect a portion of the air stream upwardly or downwardly depending upon the operator's selection of the angle of the deflector. The device of Gallagher embodies the drawbacks that the air stream leaving the blower becomes subdivided and, therefore, the full force of the air stream is no longer brought to bear on the object to which it is directed. Gallagher also has the limitation that the operator is not able to move the deflector while pushing the machine. Rather, the operator must manipulate the deflector by hand into a new position. Further, for safety reasons, the operator should shut down the Gallagher blower before changing the direction of the deflector.

Figure 2:
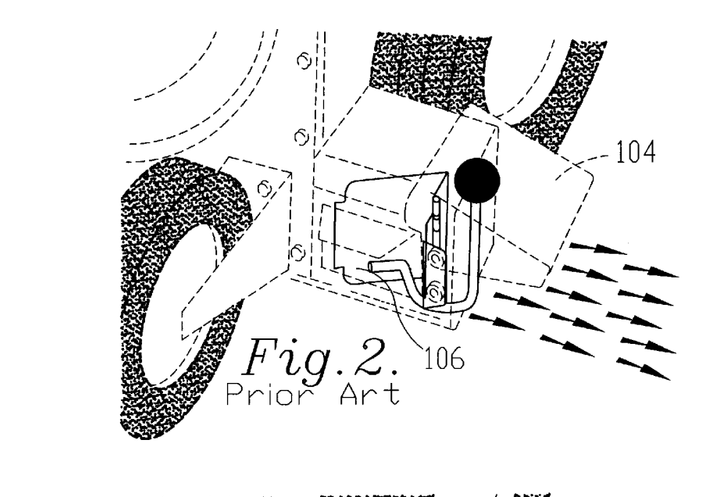
FIG. 2 is an enlarged view of the discharge chute of the device of FIG. 1 showing the discharge chute housing and top mounted deflector plate in phantom lines, and the diverter plate positioned to allow lateral discharge of air from the discharge chute.
Figure 3:
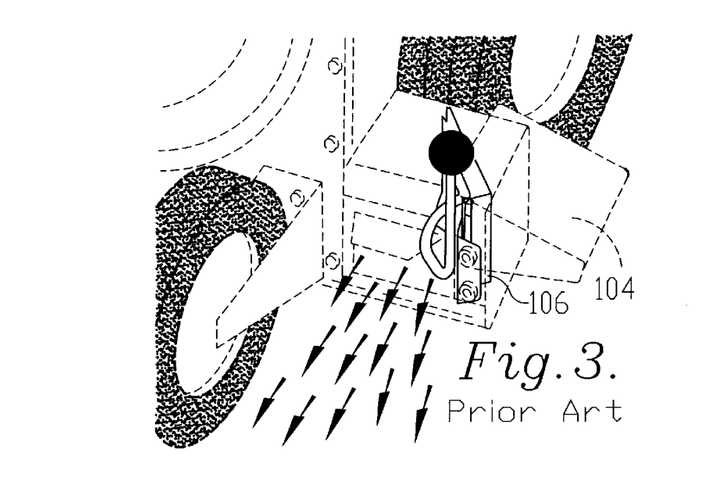
FIG. 3 is an enlarged view of the discharge chute of the device of FIG. 1 and showing the diverter plate positioned to redirect air flow in a forward direction from the discharge chute.

Referring again to FIG. 1, an alternative prior art blower is shown having a discharge chute 102 which is provided with a top mounted deflector 104 and a diverter plate 106. Diverter plate 106 is utilized to divert or deflect the air stream from exiting laterally as shown in FIG. 2, and to redirect the air to exiting discharge chute 102 in a forward direction as shown in FIG. 3. It will be appreciated by those skilled in the art that the introduction of the diverter plate 106 into discharge chute 102 does not provide a smooth transition between the air flow directed laterally and the air flow being redirected to the forward direction. This deflection method causes disruption of laminar flow and tends to reduce the force of the air stream and to introduce turbulence into the air stream as the air exits discharge chute 102 in the forward direction as shown in FIG. 3. Therefore, it would be advantageous if a blower 101 was provided with a discharge chute that is capable of directing an air blast laterally and forwardly without the introduction of diverting devices which reduce the force of the air blast and which increase the amount of turbulence in the air stream which further reduces the force of the air blast exiting discharge chute 102.

It would be a further advantage if a blower device 101 were provided with a means for allowing the operator to redirect the air stream up and down as the blower is pushed along a direction of travel. The ability to move the air stream up and down can be a particularly useful attribute depending on the type of leaves or debris being moved. In the case of wet leaves it is useful to be able to direct the air stream downwardly at the ground and at a sharp or acute angle in order to direct a strong air blast at the wet leaves or debris. However, once the leaves have been loosened, or when leaves are dry the air blast can be directed higher so the dry leaves are blown farther during the pass of the blower unit. Therefore, it also would be useful to be able to oscillate the air stream up and down to be able to loosen wet leaves and debris while being able to rapidly raise the level of the air stream to redirect the air force and blow the loosened debris farther away from the blower in one pass.

A further limitation of present blowers is that the air stream is generally directed lateral to the direction of travel of the blower. That is, the blower is pushed in a forward or rearward direction and the air stream is directed to the side. While this sideways direction of the air stream is useful in sweeping large surface areas, it is not useful when the task involves a small, long area such as the cleaning out of a crack in pavement prior to sealing the crack. Prior art devices generally require that the blower be pushed and pulled back-and-forth along the crack so that the laterally discharged air stream can be directed into the crack in the pavement that is to be filled. This results in a very tedious operation and substantially slows down the process of cleaning out cracks in streets and parking lots so the cracks can be filled.

The present invention overcomes these problems and limitations of the prior art devices by providing an air stream director which allows the blower operator to provide oscillating, up-and-down, movements of the air stream while also pushing the blower along a path of travel. The present invention also provides the blower with a neutral positioning of the air stream which can be used by the operator when the blower is proximate to an object or surface which might be damaged. The present invention can also provide the operator with a "deadman switch" for the repositioning of the air stream so the air stream is immediately directed to a neutral position which avoids the blowing of debris when the operator is not able to give attention to the blower as it is moved. In addition, the present invention overcomes the required back-and-forth movements of previous blowers by allowing the air stream to be redirected to the frontward or rearward directions and, if desired, to be oscillated up and down to allow more efficient cleaning of long thin areas such a cracks in pavement.

SUMMARY OF THE INVENTION

The present invention provides an improvement in mobile air blowers which operate to move leaves and other debris off of surfaces. The present invention provides an air stream director which may be oscillated up and down for use on a mobile blower for blowing leaves and debris from lawns and parking lots and other surfaces. In one embodiment the air stream director of the invention is automatically positionable, or has a default position, or a "deadman" position which directs the air stream away from the work direction or work piece to avoid blowing debris as the blower comes adjacent with vehicles in parking lots or other structure which could be damaged by the blowing debris. The invention also provides for an air stream directing attachment which allows redirection of the air stream direction, to the front or rear of the blower, as it moves.

The foregoing and other objects are intended to be illustrative of the invention and are not meant in a limiting sense. Many possible embodiments of the invention may be made and will be readily evident upon a study of the following specification and accompanying drawings comprising a part thereof. Various features and sub-combinations of invention may be employed without reference to other features and sub-combinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

As previously discussed, one of the problems with air blower units used in pavement repair and leaf blowing and debris blowing is that the air stream coming from the blower device is constantly blowing and cannot be turned off or turned on unless the entire blower device is turned off or turned on. In view of the previously described utility of having a blower unit which can allow redirection of an air stream into a neutral position where the air stream does not cause any effect on the surrounding environment and/or which can allow for up-and-down oscillation of the air stream, a preferred embodiment of such a device will now be described.

Figures 4, 5, 6:
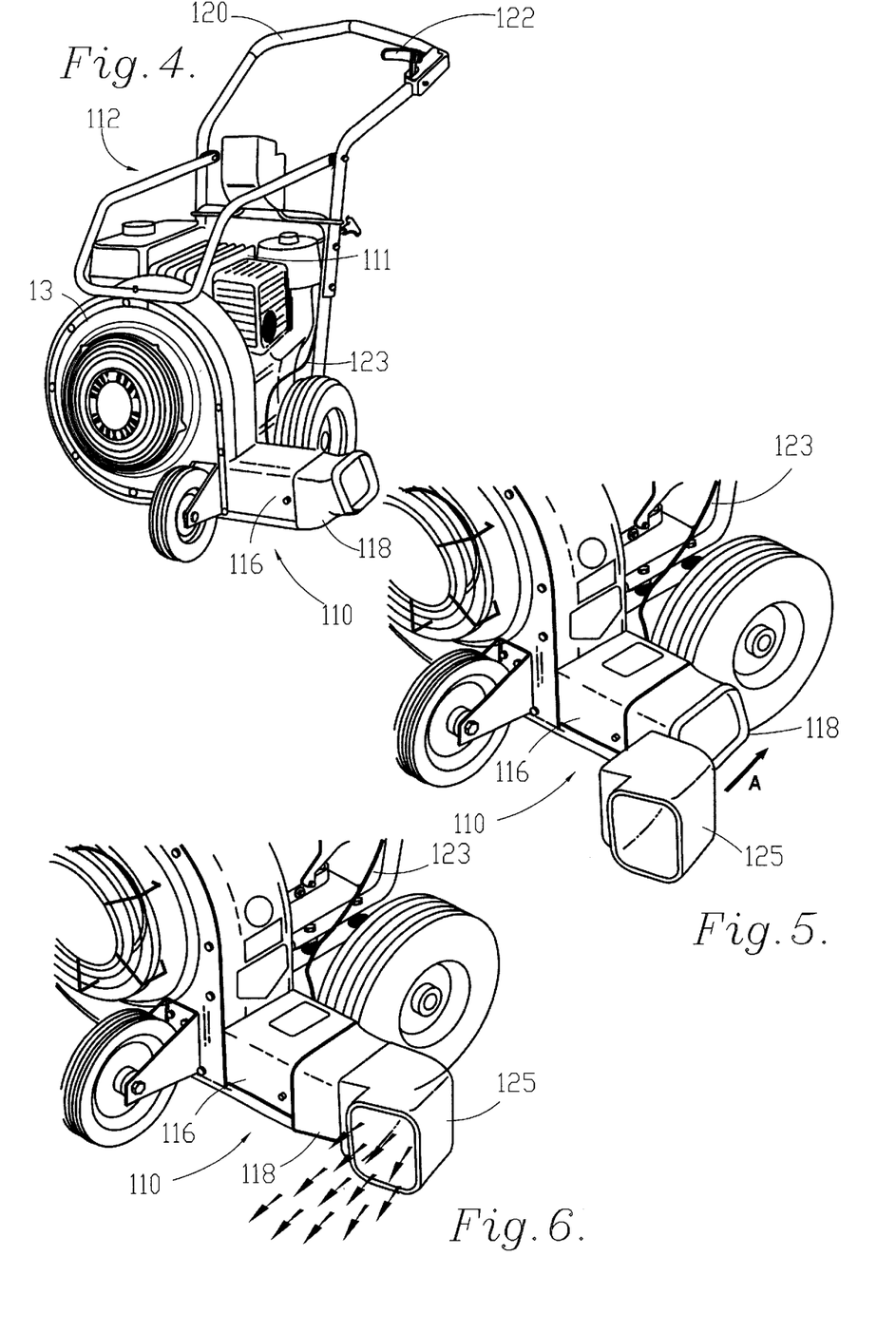
FIG. 4 is a perspective view of a blower having the present invention mounted thereon in the form of a movable air chute nozzle.
FIG. 5 shows the air chute nozzle of FIG. 4 with the air flow diverter being positioned for placement on the air flow director by pushing in the direction of Arrow A.
FIG. 6 shows the air flow diverter in place on the air flow director with the air flow indicated as now being in a forward direction.
Figure 7:
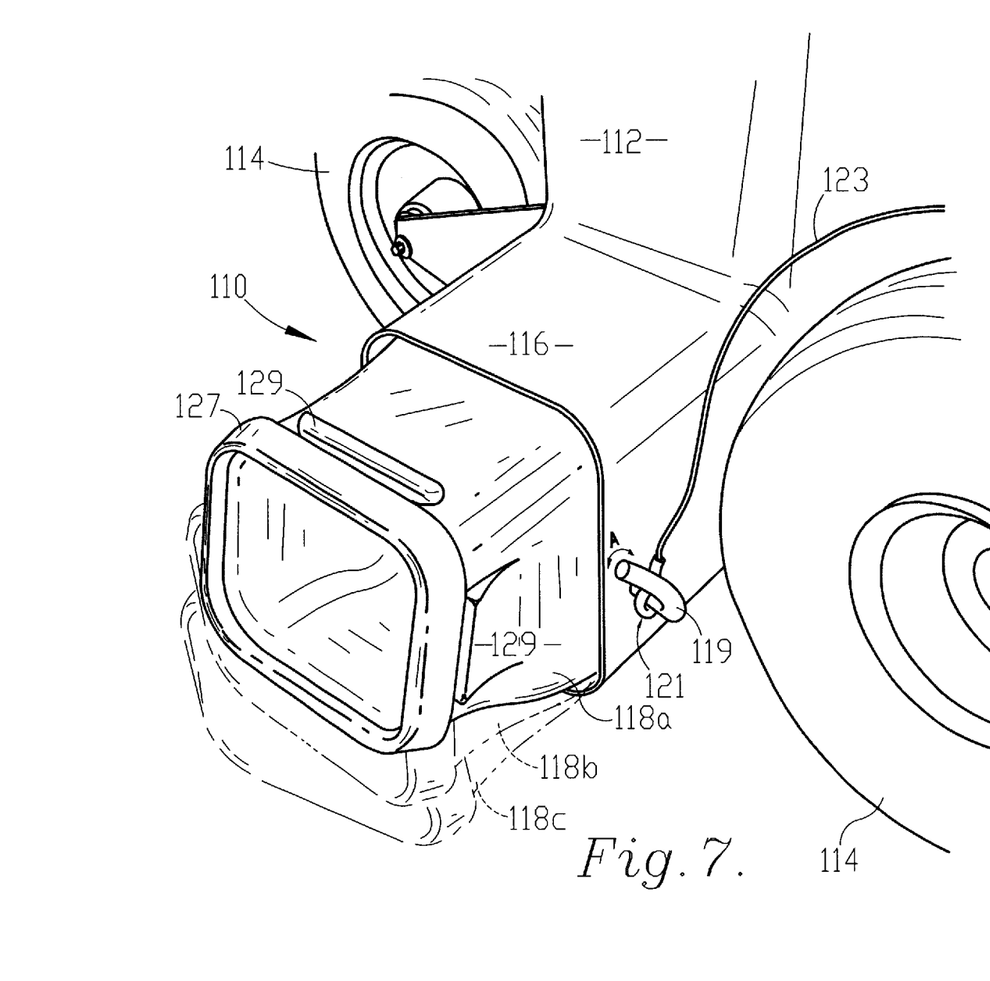
FIG. 7 is a perspective view of and the blower nozzle or air flow director projecting from the blower, in phantom lines, showing the inventive nozzle in a range of positions.

Referring now to FIG. 4, a blower unit 112 having the air flow director 118 of the present invention attached thereto is shown. Blower 112 is provided with a motor 111 which is used to drive a fan contained in housing 113. The air generated by the fan exits through cowling 116 and enters air flow director 118. Air flow director 118 can be oscillated up and down, as shown in FIG. 7, by movement of control handle 122 (FIG. 4) by the user of blower 112. The advantages gained by the ability to oscillate air flow director 118 will be described hereinafter.

Referring now to FIG. 5, the attachment of diverter 125 to air flow director 118 is shown. In FIG. 5 diverter 125 is aligned to slip over the front of air flow director 118 so that the air traveling through cowling 116 can be smoothly redirected to a forward direction as shown in FIG. 6 while maintaining a laminar flow of the air as it passes through air flow director 118 and diverter 125. As is more clearly shown in FIG. 5 and FIG. 6, cable 123 travels toward cowling 116 where it attaches to spring-biased arm 119 on which air flow director is pivotally mounted.(FIG. 7). Cable 123 is attached at its other end to control handle 122 (FIG. 4) which allows the operator of blower 112 to oscillate air flow director 118 between up position 118a, level position 118b and down position 118c while the operator or user is pushing blower 112 along a path of travel.

Referring now to FIG. 7, a typical blower unit is shown in fragmentary view. The blower unit comprises a gasoline operated small engine which causes the rotation of a fan mechanism which generates an air stream that is fed into a nozzle area 110 of blower unit 112. Typically, nozzle 110 of blower unit 112 simply directs the air outwardly from blower unit 112 in a fixed angle and direction. This inability to quickly and rapidly redirect the air stream results in the problems previously described. The present invention avoids these problems by allowing the user of a blower unit 112 to redirect the air stream from an "in use position" to an "out of use position" and to thereby allow the user to select when the air stream being directed out of nozzle 110 is actively blowing against the work piece and when the air stream is in a neutral position, usually 118a, where it will not affect the work piece.

Still referring to FIG. 7, air flow director 118 is capable of being selectively repositioned into various active positions where the air stream is partially or fully directed towards the work piece. To accomplish the positioning of air flow director 118, the user of blower unit 112 operates cable 123 which is attached to hand piece 122 (FIG. 4) on the handle of blower unit 112 where it is easily accessed by the operator. By manipulating hand piece 122 attached to cable 123, the operator can rotate spring biased arm 119 which is rotatable in the directions indicated by Arrow A. As cable 123 is lengthened or shortened by the operator, cable 123 pulls or releases connector 121 which is attached to spring biased arm 119.

Since arm or spring biased arm 119 is forced into one particular position, or operates as a "deadman switch" by a spring, it is, as a safety matter, best to have the spring biased position such that air flow director 118 is caused to be in an upward position, as shown in position 118a. This directs the air stream coming out of nozzle 110 in an upward direction, which, in most instances, will be an "inactive" air stream position which does not affect the work piece or work area on which blower 112 is intended to operate. With air flow director in the biased upward position as shown in 118a, the air flow from nozzle 110 simply is directed into the nearby air space around blower unit 112. When the air stream is directed upwardly by nozzle position 118a, the user or operator of blower unit 112 can stop the air stream from blowing rocks or gravel around the work area. This allows the operator to prevent rocks or gravel from causing damage to nearby vehicle surfaces or building exteriors or other objects and structures which could be damaged by the high-velocity air stream from blower unit 112 blowing debris and objects against those surfaces.

One typical circumstance in which this problem arises is when a blower unit is utilized to clean out cracks in a street surface or parking lot in preparation for filling of the cracks or sealing or painting the parking surface. This has long been a substantial problem with blower units, and the inability to redirect the air stream into a neutral position, such as the upward position of air flow director 118a, has caused rocks and gravel to be blown against vehicles causing significant damage to the painted surfaces of the vehicles. This problem is corrected by the inventive, positionable air flow director of the present invention.

Continuing to refer to FIG. 7, spring biased arm 119 is caused to rotate by the pulling of spring biased arm 119 out of its spring biased position thus forcing movement of air flow director 118 from the upwardly biased position of 118a and into other positions represented by position 118b and position 118c. For example, when it is desired to sweep general debris from the surface of a parking lot, air flow director 118 can be placed in position 118b or 118c such that the air stream is directed laterally or downwardly towards the surface of the parking lot. Blower 112 is then moved on wheels 114 in a conventional manner back and forth to clear the general dust and debris from the parking lot surface to allow sealing of the surface or repainting of the surface. As the operator is moving blower unit 112 along the parking lot surface and, as blower unit 112 approaches a vehicle which is parked in the parking lot, the operator can release compression of cable 123 to allow arm 119 to revert to its spring-biased upward position thus forcing air flow director 118 into the upward, or neutral position, of 118a. This repositioning of the air flow director stops the air stream from blowing on the parking lot surface and avoids damage to the parked vehicle from blowing debris and gravel against the painted surfaces of the vehicle. Once the operator has pushed blower unit 112 past the vehicle, the operator can again compress cable 123 to push air flow director from position 118a into position 118b or 118c to put the air stream coming from nozzle 110 into an active position to continue removing debris and gravel from the parking area surface.

Figure 8:
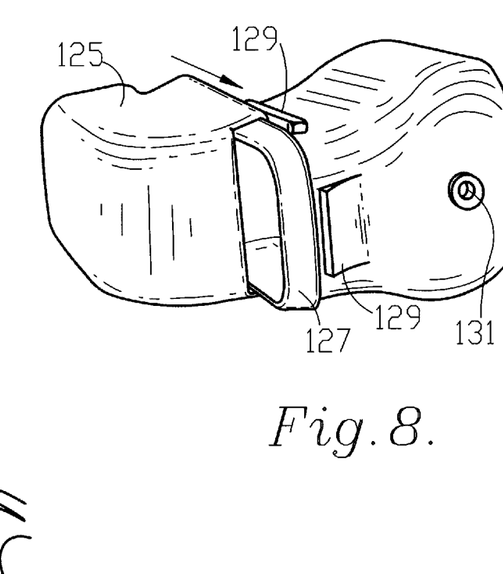
FIG. 8 is a perspective view of the air flow director of the blower nozzle with the diverter being attached to the air flow director to allow forward directing of an air stream from the air flow director.

Referring now to FIG. 8, it can be seen that pivot arm mounting hole 131 is provided in the side of air flow director 118. Pivot arm mounting hole 131 is sized to receive spring biased arm 119 which passes through nozzle 110 and through air flow director 118 until it reaches the opposite side of air flow director 118 where spring biased arm passes through a pivot arm mounting hole which is directly opposite pivot arm mounting hole 131. Spring biased arm 119 then passes out of nozzle 110 on the side of nozzle 110 which is opposite that shown in FIG. 7 where spring bias arm 119 connects with cable 123. While the spring mechanism is not shown in the drawings, it will easily be appreciated by those skilled in the art that a number of different spring configurations can be utilized to achieve spring biasing of arm 119 into a particular position.

As previously stated, air flow director 118 is spring biased into the upward position shown by position 118*a* so the air stream coming from nozzle 110 can be directed into a non-active area above the work piece during the parking lot sweeping or leaf blowing. It will be appreciated that for other applications of blower unit 112, it may be more convenient to have spring biased arm 119 orient air flow director 118 into a different position which is more useful to the particular application in consideration. Also, it can be appreciated by those skilled in the art that, if desired, spring biased arm 119 could be configured so as to continually push air flow director 118 into position 118*c* as the default position. In this situation, as an operator pushes blower unit 112 towards a vehicle which is to be avoided, the operator can actively compress cable 123 to reorient spring biased arm 119 into the upward position of 118*a* where the air stream is no longer actively sweeping debris and gravel from the surface of the parking lot to thereby avoiding damage to the parked vehicle.

Again referring to FIG. 8, an additional embodiment of the present invention will be described wherein the air stream from nozzle 110 additionally can be directed toward the front or toward the rear of blower unit 112. This front or rear redirection can be employed while continuing to redirect the upward and downward direction of the air flow or air stream utilizing air flow director 118. In the alternate embodiment of FIG. 8, with the blower unit 112 removed for clarity, diverter 125 is shown being applied to air flow director 118. Diverter 125 is, generally, a right-angle bend diverter which redirects the air stream exiting air flow director 118 by approximately 90° to direct the air stream to the front, or, alternately, to the rear of blower unit 112 (FIG. 7).

In operation, and as shown in FIG. 8, diverter 125 is pressed onto air flow director 118 and is captured between director rim 127 and director brace 129 shown on the top surface of air flow director 118. A similar brace 129 is positioned on the bottom surface of air flow director 118, and another director brace 129 is positioned at either side of air director 118. These braces serve to hold diverter 125 in close contact with rim 127.

An important distinction between the present invention and the prior art devices, such as that shown in FIGS. 2 and 3, is that the construction of the present invention avoids the substantial loss in air velocity or air stream laminar flow as diverter 125 serves to change the air flow from the lateral direction to a forward or rearward direction. In the prior art devices, the air flow direction is changed by sliding a panel across the prior art air chute at a 45 degree angle (FIG. 3) to direct the air in a forward direction. This type of redirection of the air flow causes substantial turbulence and loss of air velocity as the air stream impacts the 45 degree panel and is turned to the forward direction.

In the present invention shown in FIGS. 6 and 8, the air stream flow is maintained as laminar flow by providing a generally elongate tube which is, in this regard, distinct from the prior art devices. In the present invention, diverter 125 (FIG. 8) adds a curved tube onto the end of air stream director 118 to evenly and smoothly turn the air stream to the front or rear direction. This allows the air stream to more closely maintain laminar flow during the redirection process and allows the present invention to maintain an higher air velocity and more concentrated air stream with less turbulence than the prior art devices which rely upon an angled panel to seal off the lateral air flow and redirect the air stream in a forward direction.

Figure 9:
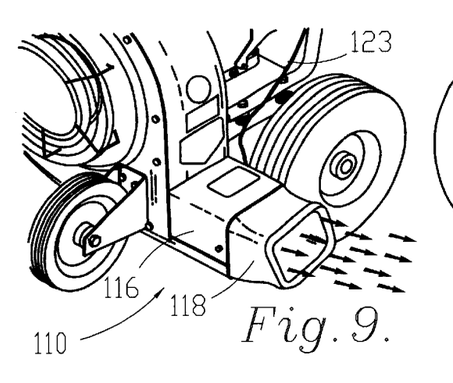
FIG. 9 is a perspective view of a section of the device shown in FIG. 4 with the air flow director in the up position.
Figure 9A:
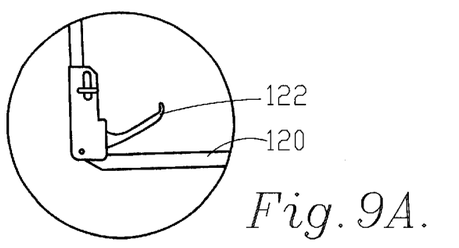
FIG. 9a shows the spring-biased hand control position which acts as a deadman's switch to place the air flow diverter shown in FIG. 9 in the up position.
Figures 10, 10A, 10B, 11, 11A:
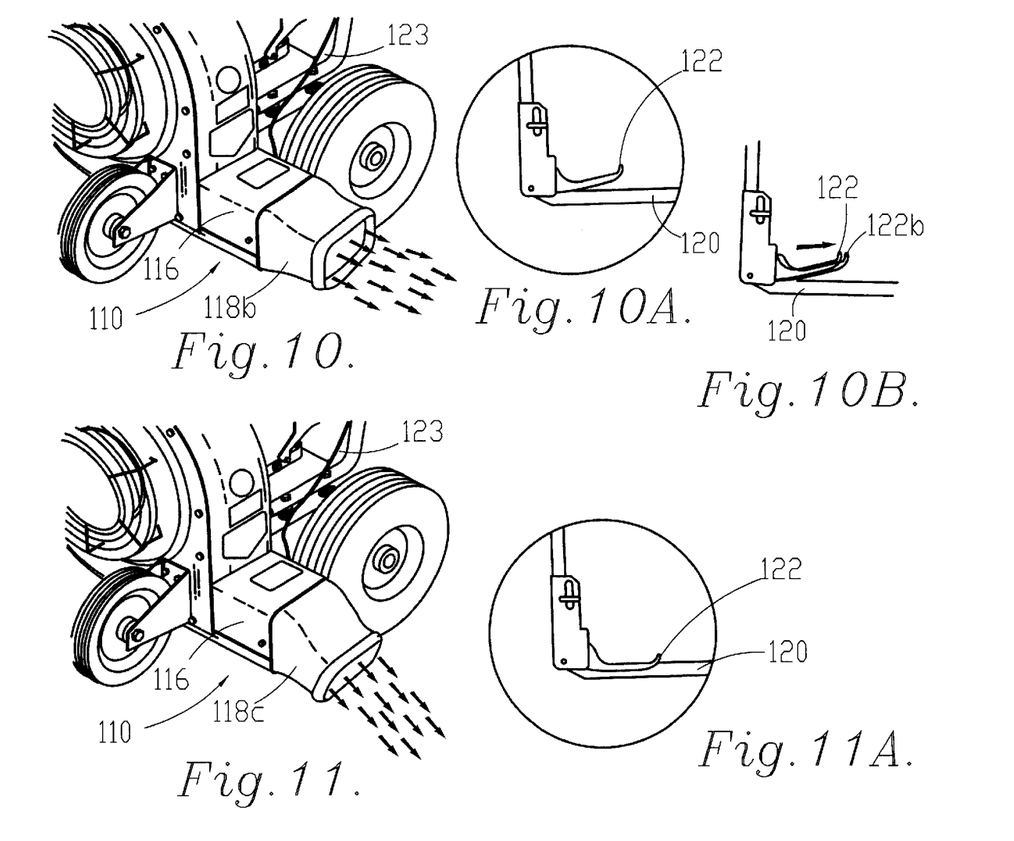
FIG. 10 is a perspective view of a section of the device shown in FIG. 4 with the air flow director in the level position.
FIG. 10a shows the position of the control handle for placing the air flow director in the level position.
FIG. 10b shows the outward movement as indicated by the arrow which can be used to lock the control handle in position for maintaining the air flow director in a level position.
FIG. 11 is a perspective view of a section of the device shown in FIG. 4 with the air flow director in the down position.
FIG. 11a shows the position of the control handle for placing the air flow director in the downward position as shown in FIG. 11.

Referring now to FIGS. 9 through 11*a*, the manner of controlling the positioning of air flow director 118 will be described. In FIG. 9, air flow director 118 is shown in the upward position. This corresponds to control handle 122 position shown in FIG. 9*a*. As shown in FIG. 9*a*, control handle 122 is shown spaced away from lower handle 120. This spacing is caused by the spring biasing of spring-biased arm 119 which pulls on cable 123 to place control handle 122 in the separated position from lower handle 120 which is shown in FIG. 9*a*. In order for the user to move air flow director 118 from the biased up position 118*a* of FIG. 9, the operator must squeeze control handle 122 against lower handle 120. In FIG. 10, air flow director 118 is shown in the level position 118*b* which is accomplished by the operator squeezing on control handle 122 to bring it closer to blower handle 120. As the operator squeezes control handle 122 against blower handle 120, the air flow director is moved from the biased up position of FIG. 9 into the level position of FIG. 10. Once the operator has moved air flow director 118 into the level position 118*b*, the operator can lock air flow director 118 into level position 118*b* by pushing control handle 122 laterally as shown by the arrow in FIG. 10*b*. In order to move control handle 122 into control handle position 122*b*. Once control handle 122 is placed into position 122*b*, the operator does not need to hold handle 122 in the position shown in FIG. 10*a* in order to maintain air flow director 118 in air flow director level position 118*b*. The operator can then, if desired, move air flow director 118 into the downward position 118*c* as shown in FIG. 11 by pressing control handle 122 in the opposite direction as shown by the arrow in FIG. 10*b* to replace control handle 122 into position 122 of FIG. 10*b*. This then places control handle 122 in the operating position and allows the user to move air flow director 118 into the lowered position 118*c* as shown in FIG. 11. When air flow director is in the forced down position or lowered position of 118*c*, control handle 122 will be in the position shown in FIG. 11*a*. In this position, the operator has fully compressed handle 122 against blower handle 120.

Figure 12:
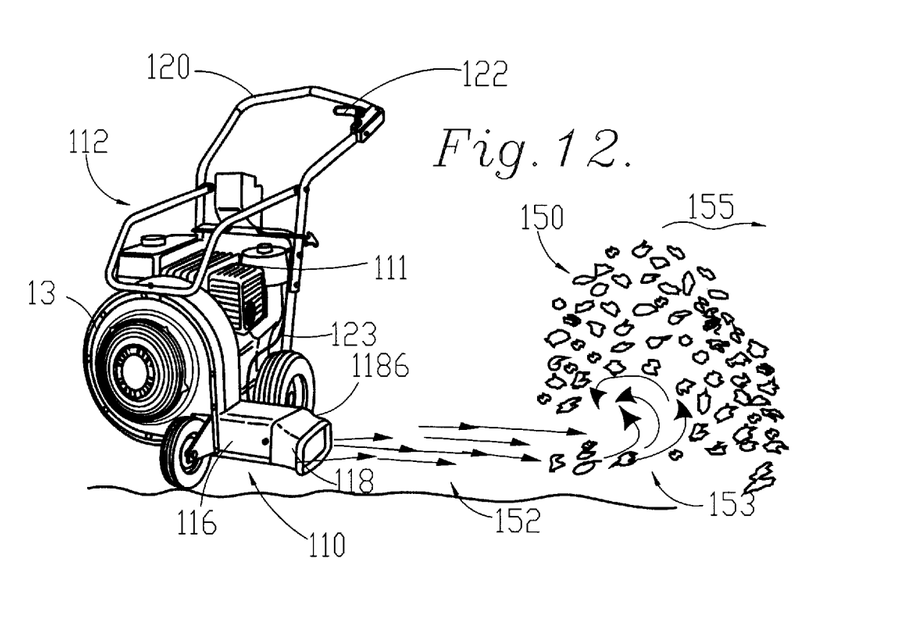
FIG. 12 shows the inventive device in operation with the air flow director in the level position and showing the condition called "lofting" in which a pile of leaves or grass or debris has become sufficiently large that the air from the blower circulates in a rotational pattern causing inflation or lofting of the pile.

Yet another advantage is obtained from the inventive oscillating air flow director of the present invention. This additional advantage permits substantial stacks of leaves to be moved in a manner not permitted by prior art devices. As shown in FIG. 12, the blower unit 112 having the inventive nozzle 110 is blowing on a pile of leaves 150. Pile of leaves 150 has been built up by using blower 112 to move several passes across a typical lawn, and in so doing, the leaves are pushed into a pile. Once the leaf pile reaches the height of three to four feet, the weight and density of the leaf pile tends to resist the air stream 152 which emanates from nozzle 110. As the pile of leaves 150 resists air flow 152, the air flow begins to develop into a circular rotation within leaf pile 150 as shown by arrows 153. The result is that the air flow from blower 110 tends to rotate within leaf pile 150 and to cause some degree of lofting or elevation of leaf pile 150. However, no further lateral movement of leaf pile 150 in the direction of arrow 155 is obtained.

Figure 13:
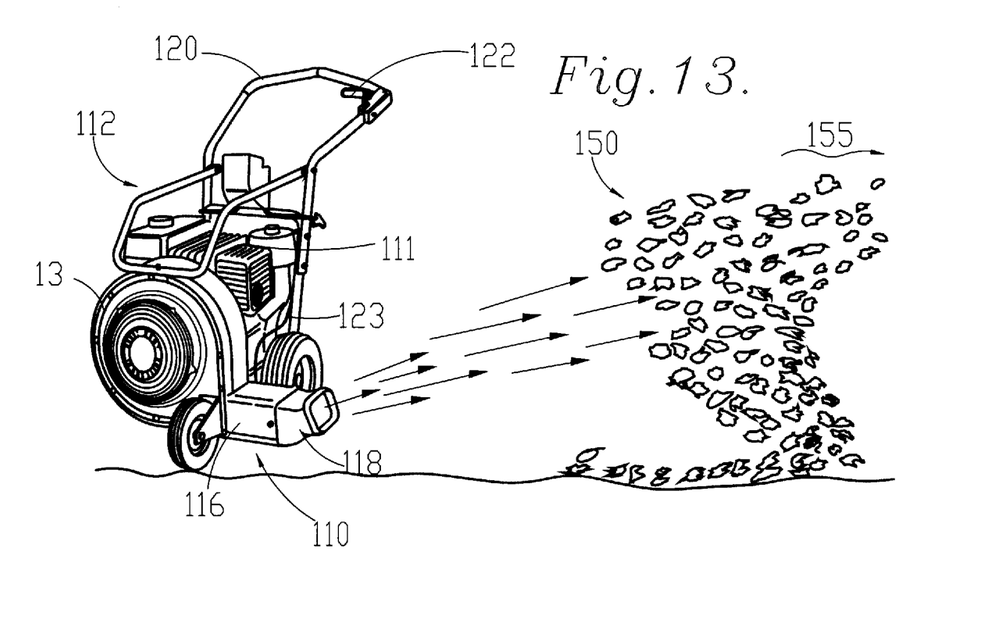
FIG. 13 shows the inventive blower air flow director once it has been rapidly raised into the upward position so that the "lofted" pile of material of FIG. 12 can be blown beyond the position where the "lofting" has occurred.
Figure 14:
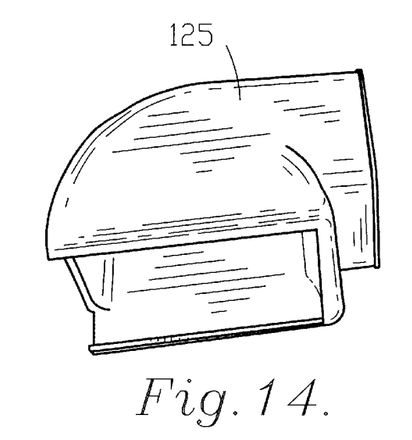
FIG. 14 is top and left side perspective view of the inventive diverter of the present invention.
Figure 15:
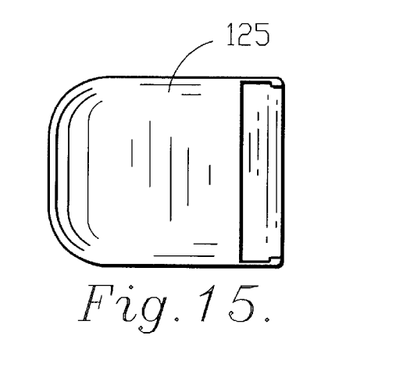
FIG. 15 is a rear elevational view of the inventive air diverter.
Figure 16:
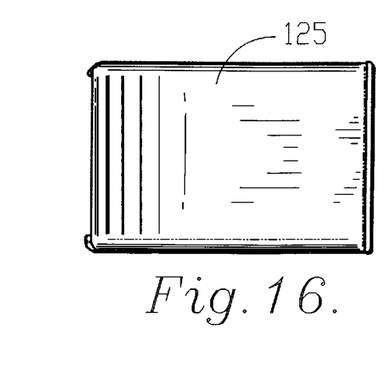
FIG. 16 is a right side elevational view of the inventive air diverter.
Figure 17:
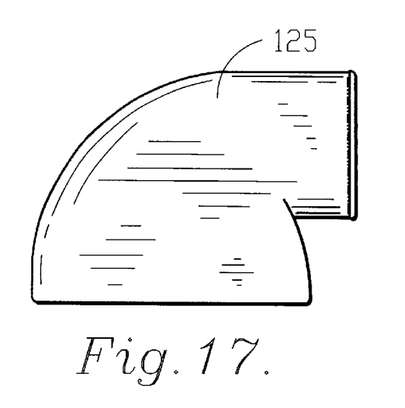
FIG. 17 is a top plan view of the inventive air diverter.
Figure 18:
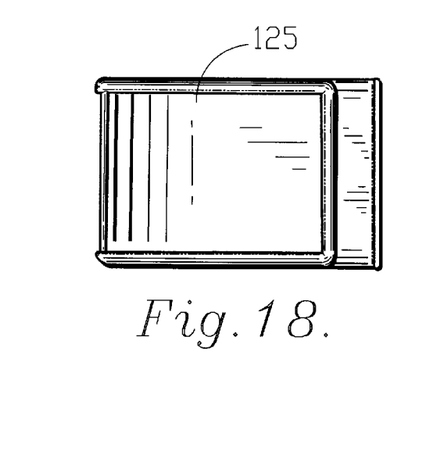
FIG. 18 is a left side elevational view of the inventive air diverter.
Figure 20:
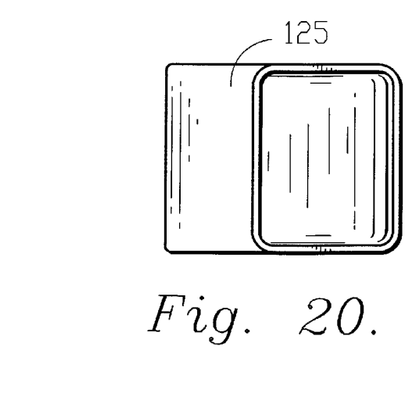
FIG. 20 is a front elevational view of the inventive air diverter.
Figure 21:
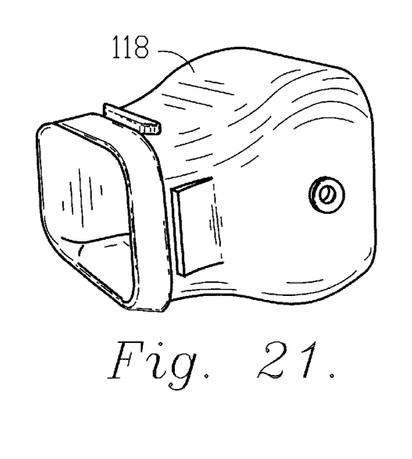
FIG. 21 is a front and right side perspective view of the inventive air flow director.
Figure 22:
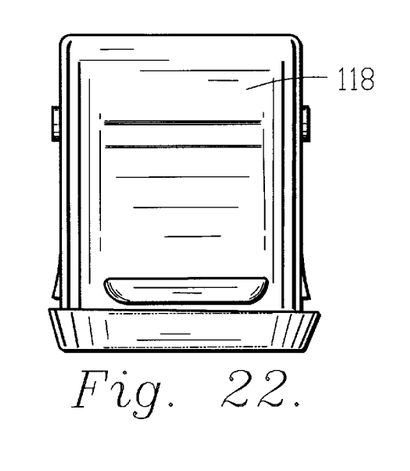
FIG. 22 is a top plan view of the inventive air flow director.
Figure 23:
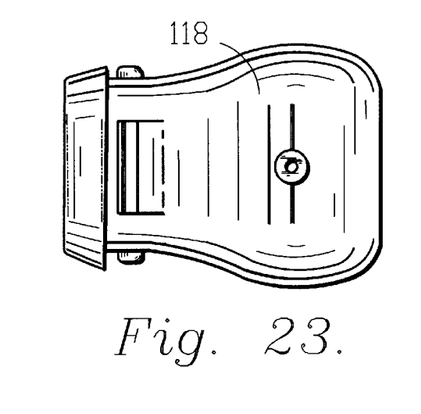
FIG. 23 is a right side elevational view of the air flow director of the present invention with the left side elevational view being a mirror image thereof.
Figure 24:
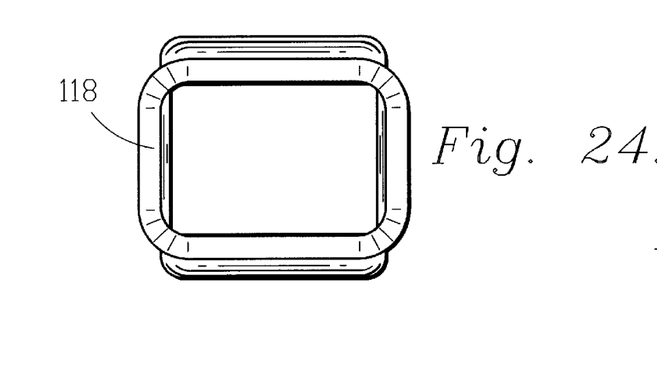
FIG. 24 is a front elevational view of the air flow director of the present invention.
Figure 25:
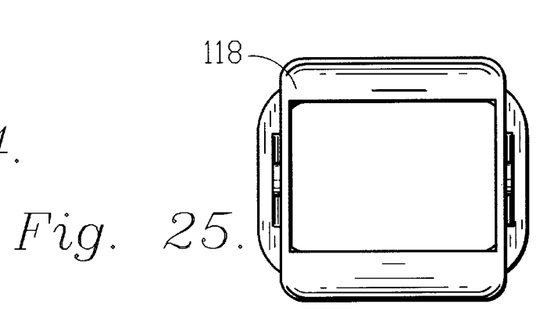
FIG. 25 is a rear elevational view of the air flow director of the present invention.

The inventive lower nozzle overcomes this debility of prior art devices by allowing the operator of blower 112 to rapidly change the vertical angle of air stream 152 coming from nozzle 110. In prior art devices, an operator might attempt to perform this act by tilting blower 112 sideways in order to attempt to quickly change the vertical angle of the air stream. In the present invention, however, this is easily and quickly and safely accomplished by the operator simply manipulating control handle 122 to change the vertical angle of air flow director 118. The result is shown in FIG. 13. In FIG. 13, the operator has allowed leaf stack 150 to loft somewhat by allowing the air to rotate within the leaf stack as shown by air circulation 153. After a moment of allowing lofting to occur, the operator simply releases control handle 122 to allow control handle 122 to move from a position shown in FIG. 10a to the position shown in FIG. 9a in order to allow nozzle 110 to move from the level position 118b shown in FIG. 10 into the upwardly biased position 118a shown in FIG. 9. The result of this action is to quickly shift the vertical angle of the air stream emanating from nozzle 110 upwardly. This then suddenly permits the air stream to be directed against the upper portion of leaf stack 150 which has just undergone the lofting action described in FIG. 12, and this rapid shift in the air stream vertical angle allows the previously immobile leaf stack to be blown farther along the direction indicated by arrow 155. In this manner, the oscillation of the inventive air flow director 118 of the present invention allows the user of blower 112 to move stack of leaves 150 farther than previous devices have permitted. All this can be accomplished by the user of blower 112 having inventive nozzle 118 situated thereon without the need for the difficult and unsafe procedure of tilting blower 112 upwardly as a unit in order to redirect the vertical angle of the air stream coming from the blower.

As described in the description of the drawings, FIGS. 14–25 are presented to more particularly show the two portions making up the air flow director and air flow diverter combination. As can be seen in FIGS. 14–20, diverter 125 is provided with a smooth interior curvature in order to reorient the air flow from a lateral to a forward or rearward direction as the air stream escapes air flow director 118. By examining FIGS. 21–25, it can be appreciated that air flow director 118 further promotes laminar flow of the air stream by smoothly collecting the air stream from cowling 116 (FIG. 7) and smoothly redirecting that air stream into a slightly smaller opening. In this manner, the air stream avoids the sharp rectangular corners of prior art devices and is redirected in an even, smooth fashion by which laminar flow is maintained. Laminar flow continues to be maintained as the air stream leaves air flow director 118 and is reoriented at a right angle to the front or the rear of blower 112 (FIG. 6) so that the air stream can be used for cleaning out pavement cracks and the like which are most efficiently accomplished by having the air flow directed to the front or to the rear of blower 112 (FIG. 4).

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive blower air stream diverter is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. In a blower comprising a frame mounted on wheels to allow a user to move the blower along a path of travel, a motor mounted on the frame, the motor driving a fan to provide a high velocity air stream to a discharge chute, the improvement comprising:

an air stream directing tube pivotally mounted in said discharge chute, said tube being user repositionable from a first position to a second position while the fan continues in operation and while the user is moving the blower along the path of travel.

2. The apparatus as claimed in claim 1 wherein said tube is provided with a default position which directs the air stream away from the work area.

3. The apparatus as claimed in claim 2 wherein said tube automatically repositions itself to said default position upon the user ceasing a repositioning force on said means to hold said means toward the work area.

4. The apparatus as claimed in claim 1 further comprising a second tube attachable to said air stream directing tube to permit redirection of the air stream to a different angle than is provided by the air stream directing tube.

5. A user controlled air stream directing apparatus for the air exit nozzle of a mobile air blower comprising:

a tube for directing the air stream exiting the nozzle of the blower, means for pivotally mounting said tube in the nozzle to permit up-and-down oscillation of said tube in said nozzle, means for controlling the up-and-down oscillation of said tube in said nozzle to allow the user to move said tube from a first air stream discharge angle to a second air stream discharge angle.

6. The apparatus as claimed in claim 5 further comprising a second tube attachable to said air stream directing tube to permit redirection of the air stream to a different angle than is provided by the air stream directing tube.

7. The apparatus as claimed in claim 5 further comprising means for automatically forcing said tube into a first position until the user directs said tube to said second working.

* * * * *